United States Patent [19]

Sartoretto et al.

[11] 4,298,512

[45] Nov. 3, 1981

[54] UREA FORMALDEHYDE DISPERSIONS MODIFIED WITH HIGHER ALDEHYDES

[75] Inventors: Paul Sartoretto, North Brunswick; Kak-Yuen Tao, Highland Park, both of N.J.

[73] Assignee: W. A. Cleary Chemical Corporation, Somerset, N.J.

[21] Appl. No.: 143,367

[22] Filed: Apr. 24, 1980

[51] Int. Cl.$^3$ ............................................... C08L 61/24
[52] U.S. Cl. ................................. 260/29.4 R; 71/28; 528/259
[58] Field of Search ................... 260/29.4 R; 528/259; 71/119, 123, 28

[56] References Cited

U.S. PATENT DOCUMENTS

| | | | |
|---|---|---|---|
| 2,766,283 | 10/1956 | Darden | 528/259 |
| 3,198,761 | 8/1965 | O'Donnell | 528/259 |
| 3,326,665 | 6/1967 | Schäfer et al. | 71/28 |
| 3,438,764 | 4/1969 | Church | 528/259 |
| 3,441,539 | 4/1969 | Schafer et al. | 528/259 |
| 3,712,879 | 1/1973 | Strickrodt et al. | 528/259 |
| 3,759,687 | 9/1973 | Nobell | 260/29.4 R |
| 4,033,745 | 7/1977 | Moore | 71/28 |
| 4,102,840 | 7/1978 | Pusch | 528/259 |

FOREIGN PATENT DOCUMENTS 1212254 11/1970 United Kingdom .

OTHER PUBLICATIONS

Yee and Love, Proc. Soil Sci. Soc. Am. 11, (1946), pp. 389–391.
Clark et al., Ind. & Eng. Chemistry, 40 (1948), pp. 1178–1183.
Official Methods of Analysis of the Association of Official Agricultural Chemists, 11th Ed., 1970, pp. 18, 19.

*Primary Examiner*—Theodore E. Pertilla

[57] ABSTRACT

A process for the preparation of neutralized, urea aldehyde polymeric dispersions by acid catalyzed reaction of urea and formaldehyde plus a higher aldehyde, having from two to four carbon atoms, wherein the mol ratio of formaldehyde to the higher aldehyde is at least 2:1 and the function of the higher aldehyde is to act as an inhibitor of further polymerization. The dispersions are further stabilized against settling by the addition of thickener-suspending agents. The products of the process are useful as sources of nitrogen which continue to fertilize plants, especially grasses for long periods of time after applied by means of conventional spraying equipment.

24 Claims, No Drawings

UREA FORMALDEHYDE DISPERSIONS MODIFIED WITH HIGHER ALDEHYDES

BACKGROUND OF THE INVENTION

This invention pertains to urea-aldehyde dispersions useful as fertilizers which have long lasting nitrogen release characteristics coupled with low plant damaging properties, to processes for preparing such dispersions and to their application. More particularly, it relates to dispersions formed during polymerization reactions of urea and formaldehyde when modified by the use of small amounts of a higher aldehyde containing from 2 to 4 carbon atoms as cross-link inhibitors or chain stoppers to prevent the setting-up or hardening of the dispersions upon aging. Settling is minimized by the addition of thickener-suspending agents and the solids made dispersible on plants by the addition of surfactants.

Urea formaldehyde condensation polymers have been used extensively for many years alone or in conjunction with fillers or sheets to make solid or laminated products. Scrap material from such products was used as a cheap source of nitrogen fertilizer, but proved unreliable and uncontrollable. Yee and Love, *Proc. Soil Sci. Soc. Am.*, 11, 389-92 (1946) and Clark, Yee and Love, *Ind. Eng. Chem.*, 40, 1178-83 (1948) demonstrated that the control of the rate of useful nitrogen release from urea formaldehyde polymers was a function of urea/formaldehyde ratio, molecular weight, cold and hot water insolubility and other factors.

It is desirable to provide fertilizers which release nitrogen at rates which enhance the growing of plant life and in particular, turf, without damaging the plant root systems or the foliage by the excessively rapid uptake of nitrogen, nor starving the plants because of a severely low rate of nitrogen release.

Generally, urea formaldehyde fertilizers in solid form have found widespread use but are difficult to apply uniformly. The rate with which nitrogen is made available to the plants is a function of the composition of a urea aldehyde fertilizer. Soluble, unreacted urea releases nitrogen rapidly; soluble, low molecular weight reaction products of urea and aldehydes release nitrogen less rapidly; cold water insoluble nitrogen (CWIN) in the polymeric products is slowly released; and hot water insoluble nitrogen (HWIN) in the polymeric products is released only over long periods of time. The methods for determination of the water insoluble nitrogen (WIN) and the proportion of CWIN and HWIN are given in the Official Methods of Analysis of the Association of Official Agricultural Chemists, 11th Ed., 1970. The composition which is preferred varies with the application. For example, commercial lawn applicators prefer complete nitrogen release in sixty to ninety days whereas golf course operators prefer longer release periods, requiring products with high WIN.

Attempts to produce fertilizers which release nitrogen at some controllable rate have taken several forms. For example, U.S. Pat. No. 3,441,539 to Helmut Karl Schafer et al, reported that slow nitrogen release granulated fertilizers are produced by co-condensation reactions of urea, a saturated aldehyde having 3-4 carbon atoms and formaldehydes wherein the saturated aldehyde is present in greater molar concentration than formaldehyde. An improvement in the handling characteristics of these solid products is claimed in U.S. Pat. No. 3,326,665, by Helmut Karl Schafer, et al, by the addition of certain swellable substances such as carboxymethyl cellulose, polyacrylamide, etc to the reaction mixture in the absence of solvent.

Another approach to the problem is exemplified by U.S. Pat. No. 3,054,669, to Johann Jung, et al, which shows that crotylidene diurea alone or in admixture with other nitrogenous fertilizers and inert materials can be applied to the soil as slow-acting nitrogenous fertilizers.

Many other patents describing the preparation and use of urea-aldehyde reaction products for providing slow acting fertilizers will be familiar to those skilled in the art.

However, for ease and uniformity of application to fill the specific needs of turf areas such as golf courses, nurseries, institutional and home lawns, especially those serviced by commercial lawn care operators, it is econcomically desirable to provide nitrogen at growth promoting levels for relatively long periods by means of application of liquid fertilizers.

The present methods of preparing liquid fertilizers are those which involve the milling of solid ureaformaldehyde or other polymeric sources of nitrogen, blending the pulverized materials with additives to facilitate wetting and the formation of stable dispersions in aqueous systems and pumping the resulting dispersions through conventional spray nozzle applicator equipment. Unfortunately, such techniques are often unsatisfactory because of the difficulty in achieving particle size distributions which, on the one hand, do not contain substantial amounts of fines which blow away in the wind or, on the other, coarse particles which clog the spray nozzles or, even worse, settle into non-dispersible aggregates in the spray tanks.

The preparation of liquid fertilizers of urea formaldehyde polymers is summarized in U.S. Pat. No. 4,033,745 to William Percy Moore, entitled "Non-Burning Storable Liquid Fertilizer". The Moore patent provides a suspension of urea formaldehyde polymers which is stabilized by the use of alcohol and sugar additives.

The present invention provides stable, aqueous dispersions of urea-aldehyde polymers useful as sprayable liquid fertilizers in the growing of crops, particularly lawn crops, which are storable for relatively long periods of time and reduce the danger of clogging the spray equipment. After application to the plants, the urea-aldehyde contained in the dispersion releases nitrogen for use by plants at rates desired by the user without burning the plants and without frequent application.

SUMMARY OF THE INVENTION

When urea is reacted with formaldehyde in an aqueous medium in the presence of an acid catalyst the urea-formalyehyde dispersions which form are unstable because polymerization and cross-linking apparently continue even at neutral pH, the solids becoming aggregated and lacking in dispersibility.

According to the present invention a higher aldehyde having from 2 to 4 carbon atoms, preferably acetaldehyde and/or propionaldehyde is employed in the reaction of urea and formaldehyde in an amount which provides a molar ratio of formaldehyde to higher aldehyde of at least 2:1. The higher aldehyde enters into the reaction to form alkylene diureas and dialkylene triureas as with formaldehyde but introduces sufficient heterogeneity into the polymer chains which form so that aggregation and/or polymer growth are inhibited.

The result is that the insoluble fraction of the reaction product does not aggregate or cake and is readily dispersed by shaking so that it may be sprayed without further modification. By the use of thickener-suspending agents, the systems are stabilized so that the dispersions have long shelf lives without aggregation. Finally, by the addition of non-ionic surfactants, the solids which remain on the plants after spraying are made redispersible by rainfall or normal irrigation practices.

DETAILED DESCRIPTION OF THE PREFERRED EMBODIMENTS

In preparing the dispersions of this invention, urea, formaldehyde, and the higher aldehyde are dissolved in water which is then acidified to start the reaction. The higher aldehyde is preferably acetaldehyde, propionaldehyde or mixtures thereof. Butyraldehydes including n-butyraldehyde or iso-butyraldehyde are also useful but are somewhat less effective than $C_2$ and $C_3$ aldehydes. The order of addition is not important so long as heat is removed to limit the reaction temperature to about 130° F. to 150° F. (54.4° C.–65.6° C.) to maintain better product control. Substitution of a urea-formaldehyde concentrate, "U.F.C. 85" which is 60% formaldehyde, 25% urea and 15% water, for part of the required components results in less heat evolution and easier control of the reaction. Upon completion of the reaction, the dispersion is neutralized by base.

The molar ratio of formaldehyde to higher aldehyde in the reaction should be at least 2:1. The upper limit of this ratio will depend on the type of higher aldehyde used, reaction conditions and the desired degree of inhibition of polymer growth. In general such upper limit should be no higher than about 50:1. In the case of acetaldehyde the preferred ratio of formaldehyde to acetaldehyde is about 3:1 to 19:1 and in the case of propionaldehyde the preferred ratio is from 3:1 to 49:1.

The urea concentration of the neutralized dispersion may range from about 5% to 20% (as nitrogen by weight) with a preferred nitrogen content of about 13% to 19%. It is desirable for the nitrogen content to be as high as possible consistent with the solubility limits of the starting materials.

High ratios of urea to total aldehydes (formaldehyde and higher aldehydes) yield products high in readily available nitrogen and low in WIN. Product composition must be tailored to the requirements of commercial users over a range of urea: aldehyde ratios of about 1:1 to 2.5:1, with a preferred range of about 1.3:1 to 2:1.

If the dispersion is prepared without the use of thickener-suspending agents, the dispersion will eventually separate into two layers, although the lower layer of insolubles is readily dispersible. For most applications it is preferable to stabilize the dispersions so that little or no separation of solids takes place thus avoiding any requirement for mixing or agitation in the field. Small amounts of thickener-suspending agents should be used to stabilize the dispersions against syneresis. Typical of the thickener-suspending agents which may be used are vegetable gums such as xanthan gum and sodium carboxymethyl-cellulose and microcrystalline cellulose, etc, in amounts of from about 0.01% to 1%, preferably from about 0.03% to 0.1%.

A desirable property of the fertilizer formed by the dispersions of this invention is that the solids which remain on the grass or other plant surfaces after spraying be readily redispersible when wet with water so that they may be washed into the soil rather than lost by mowing. Non-ionic surfactants are useful for this purpose. Typical types which may be used are ethoxylated castor oil, ethoxylated alkylethers, etc, known by several trade names, preferably with cloud points of 140° F. (60° C.) or higher and added in amounts of from about 0.1% to 5%, preferably from about 0.5% to 2%. Normal irrigation practices or rain fall will then readily wash the dried fertilizer from the plant surfaces into the soil.

The enumeration of types of thickener-suspending agents or surfactants is for illustration only and can be varied by those skilled in the art.

The following examples will serve to further illustrate the preferred embodiments of this invention.

EXAMPLE 1

This example demonstrates the preparation of an aqueous dispersion of urea-aldehyde condensation polymer, according to the invention, having a high WIN content and high viscosity while remaning sprayable.

About 120 lbs (54.4 kg) of urea were dissolved in about 102 lbs (46.3 kg) of hot water so that the resultant temperature was about 75° F. (23.9° C.) with a pH of approximately 9.4. The pH was adjusted to approximately 4.0 by the addition of 1:1 sulfuric acid. A mixture of about 6.5 lbs (2.95 kg) of acetaldehyde and about 111 lbs (50.4 kg) of formalin (37% formaldehyde) was added to the urea solution with continuous stirring over a period of fifteen minutes. The molar ratio of urea to aldehyde was about 1.3:1 and that of formaldehyde to acetaldehyde about 10:1. The pH dropped to about 3 and the temperature rose to 180° F. (82.2° C.) in the absence of cooling. After about ten minutes more, about 1.25 lbs (0.567 kg) of 45% caustic potash were added, followed by back titration to about pH 7 with 0.36 lb (0.16 kg) 1:1 sulfuric acid. About 9.5 lbs (4.3 kg) of a non-ionic surfactant, an ethoxylated castor oil (N.L. Industries "SF 365") were added followed by the addition of 0.17 lbs (0.077 kg) of a thickener-suspending agent, a xanthan gum (Kelco "Kelzan") dispersed in 1 lb (0.45 kg) of propylene glycol. The density of the dispersion was 9.5 lbs/gal (1.14 g/ml), containing 15.7% nitrogen by weight. The viscosity, measured on a Brookfield Viscometer, stabilized at 2250 cps remaining at that level for several months. No syneresis was evident even after one year of sample storage. The nitrogen was distributed as follows (reported as % of total nitrogen):
  13% as urea;
  14% as soluble urea-aldehyde;
  73% as WIN made up as
    35% CWIN and
    38% HWIN.

EXAMPLE 2

This example demonstrates the application of the dispersion of Example 1 to golf course greens consisting of a mixture of poa annua and penn cross bentgrass, lowcut a 3/16 in (4.76 mm), which are highly susceptible to burning when soluble fertilizers are applied without being watered in. Spraying was done by means of conventional spray equipment at about 80° F. (26.7° C.) at a coverage of about 6 lbs/1000 sq. ft. (2.93 kg/100 sq.m.) of actual nitrogen with only a minor tip burn which dissipated in 48 hours. When a coverage of 4 lbs/1000 sq. ft (1.95 kg/100 sq.m.) of actual nitrogen was applied no tip burn at all was observed. In both cases satisfactory greening resulted.

EXAMPLE 3

This example demonstrates the effect of lower reaction temperature and higher reaction pH in lowering the viscosity of the dispersion while resulting in a product with a high WIN content.

About 120 lbs (54.4 kg) of urea, 120 lbs (54.4 kg) of hot water, 111.5 lbs (50.4 kg) of formalin (37% formaldehyde) and 13.5 lbs (6.12 kg) of an approximately 50% acetaldehyde-water solution were mixed and agitated to give a clear solution at 75° F. (23.9° C.). About 96 g of 1:1 sulfuric acid were added to give a pH of about 4.25. The pH dropped to about 3.9 and the temperature rose to 110° F. (43.3° C.). The reaction mixture became milky in about five minutes at a temperature of 122° F. (50° C.) and when the temperature rose to 130° F. (54.4° C.) in another 5 minutes the reaction was stopped by the addition of about 339 grams of 45% caustic potash to a pH of about 12. Addition of about 110 g of 1:1 sulfuric acid dropped the pH to about 7. About 3 lbs (1.36 kg) of a non-ionic surfactant, an ethoxylated castor oil (N.L. Industires "SF 365") and about 0.19 lbs (0.085 kg) of a thickener-suspending agent, a xanthan gum (Kelko "Kelzan") dispersed in about 1.87 lbs (0.85 kg) of propylene glycol were immediately added. The resulting dispersion contained about 14.9% nitrogen by weight with a initial Brookfield viscosity of about 295 cps at 77° F. (25° C.). The viscosity rose to about 1100 cps after several months, with no syneresis.

EXAMPLE 4

This example demonstrates the use of propionaldehyde to prepare a dispersion which does not exhibit syneresis.

About 240 grams of urea, 254 g of water, 223 g of formalin, (37% formaldehyde) and about 18 g of propionaldehyde were mixed and agitated to form a solution. About 0.5 g of 1:1 sulfuric acid was added with a resultant drop in pH to 4. The beginning temperature was 79° F. (26.1° C.) which rose to about 165° F. (73.9° C.) in 27 minutes as the pH dropped to about 3.2. The reaction was neutralized by the addition of 0.9 g of 45% aqueous caustic potash. About 20 g of a non-ionic surfactant, an ethoxylated castor oil (N.L. Industries "SF 365") and 10.25 g of a dispersion of about 14.5% by weight of a thickener-suspending agent, a xanthan gum (Kelco "Kelzan") dispersed in propylene glycol were added. The nitrogen content of the dispersion was about 14.4%. A Brookfield viscosity of about 332 cps resulted. No syneresis occured over a period of several months.

EXAMPLE 5

This example demonstrates the preparation of an aqueous dispersion of urea-aldehyde condensation polymer, having a mixed higher aldehyde content in a preparation similar to that of example 4.

About 240 g of urea, 223 g of formalin (37% formaldehyde), 13.5 g of 50% aqueous acetaldehyde, 8.7 g of propionaldehyde and 248.6 g of water were mixed with an addition of about 0.45 g 1:1 sulfuric acid as a catalyst and reacted for 28 minutes resulting in a rise in temperature to about 165° F. (73.9° C.). The reaction system was neutralized by the addition of about 0.85 g of 45% aqueous caustic potash to a pH of 7. About 21 grams of a non-ionic surfactant, an ethoxylated castor oil (N.L. Industries "SF 365") were added followed by the addition of about 10.3 g of a 14.5% by weight of a dispersion of a thickener-suspending agent, a xanthan gum (Kelco "Kelzan") in propylene glycol. The resulting Brookfield viscosity of the dispersion was 376 cps at 77° F. (25° C.) with the nitrogen content being about 14.4%. After several months no syneresis was observed in this system.

EXAMPLE 6

This example demonstrates the difference in the process techniques brought about by the reduction in the magnitude of the exothermic reaction when "U.F.C.-85" (60% formaldehyde, 25% urea and 15% water) is used in place of part of the urea and formaldehyde required for the preparation. Control of the reaction is facilitated because the reaction velocity may be decreased by running the reaction at a lower temperature than is otherwise attained in the absence of U.F.C.-85.

About 98 lbs (44.5 kg) of urea were dissolved in 132 lbs (59.9 kg) of hot water to form a clear solution having a pH of about 9. To this solution was added 50 lbs (22.7 kg) of U.F.C.−85 and 10 lbs (4.54 kg) of a 50% acetaldehyde water solution. The pH was adjusted to approximately 4 by the addition of about 0.08 lbs (36 g) of concentrated sulfuric acid. Heat was then applied to the reaction system. Cloudiness occured at about 96° F. (35.6° C.) and the reaction was terminated when the temperature reached 143° F. (61.7° C.) by the addition of about 0.42 lbs (192 g) of 45% caustic potash to bring the pH to about 7. About 7.5 lbs (3.4 kg) of a non-ionic surfactant, an ethoxylated castor oil (N.L. Industries "SF 365") were added followed by the addition of about 2.47 lbs (1.12 kg) of a 10% by weight dispersion of a thickener-suspending agent, a xanthan gum (Kelco "Kelzan") in propylene glycol. The nitrogen content of the resulting dispersion was approximately 16.9% with an initial viscosity of about 230 cps at 80° F. (26.7° C.) and a density of about 9.6 lbs per gallon (1.15 g per ml). Analysis of the batch showed the percent of total nitrogen to be 17.9% as urea, 58.9% as soluble urea aldehyde, and 23.2% WIN made up of 18.9% CWIN and 4.3% HWIN.

EXAMPLE 7

This example demonstrates the preparation of an aqueous dispersion of urea aldehyde polymer in which the higher aldehyde is acetaldehyde and the molar ratio of formaldehyde to acetaldehyde is 19:1 representing the optimium ratio achieved.

About 960 g of urea, 1352 g of hot water, 561 g of U.F.C.-85 and 52 g of acetaldehyde were mixed and agitated followed by the addition of about 2.15 g $H_2SO_4$ to adjust the pH to 4. Heat was applied. Turbidity was visible at 98° F. (38.7° C.). At about 142° F. (61.1° C.) about 2.6 g of 45% caustic potash were added to bring the pH to about 7. About 76.5 g of a non-ionic surfactant, an ethoxylated castor oil (N.L. Industries "SF 365") and about 24.3 g of a solution of about 14.5% by weight of a thickener-suspending agent, a xanthan gum (Kelco "Kelzan") dispersed in propylene glycol were added. The viscosity of the dispersion was about 288 cps at 80° F. (26.7° C.) and its nitrogen content 16.7%. No syneresis was observed after several months.

EXAMPLE 8

This example demonstrates the preparation of an aqueous urea aldehyde dispersion wherein acetaldehyde is the higher aldehyde and which dispersion is not stabilized by thickener-suspending agents or surfactants.

About 100 lbs (45.4 kg) of urea, 17 lbs (62.1 kg) of water, 46 lbs (20.9 kg) U.F.C.-85 and 10 lbs (4.54 kg) of a 50% acetaldehyde water solution were mixed and the pH adjusted to about 4 by the addition of about 0.1 lb (0.045 kg) of concentrated sulfuric acid. The reaction was allowed to proceed until the temperature reached 140° F. (60° C.) when the dispersion was neutralized to a pH of about 7 with about 0.4 lb (0.18 kg) of 45% caustic potash. About 500 ml of sample, having a nitrogen content of about 17.5%, were removed for study. The bulk of the dispersion was then further treated as further described in Example 9.

After 48 hours the dispersion in the sample bottle began to separate from the mother liquor. After two weeks the supernatant, clear liquid was about equal in volume to the loose, sedimentary layer which was easily redispersed by shaking. After about 3 months, the sediment could still be redispersed by shaking indicating that this dispersion has an extended, usable shelf-life in spite of sedimentation.

EXAMPLE 9

This example demonstrates the effect of thickener-suspending agents and surfactant on the product of Example 8.

To the neutralized dispersion of Example 8 were added about 2.5 lbs (1.15 kg) of a 10% propylene glycol dispersion of a thickener-suspending agent, a xanthan gum (Kelco "Kelzan") and about 7.5 lbs (3.40 kg) of a non-ionic surfactant, an ethoxylated castor oil (N.L. Industries "SF 365"). The initial viscosity of the dispersion was about 180 cps at about 80° F. and rose as shown below:

| Day | $\eta$ cps | Day | $\eta$ cps |
| --- | --- | --- | --- |
| 0 | 180 | 18 | 541 |
| 1 | 192 | 62 | 720 |
| 7 | 357 | 96 | 1048 |

It is clear that the viscosity was reaching a plateau. No syneresis was observed after a total of about five months. Nitrogen analysis showed that 28% was present in free urea, 53% in soluble urea aldehyde, 19% WIN all of which is CWIN for a nitrogen content of 16.9%.

EXAMPLE 10

This example demonstrates the long term greening effect of the nitrogen slowly released from the urea aldehyde dispersion of Example 9 as compared with the nitrogen rapidly released from urea.

To the same type of turf as described in Example 2 were applied one lb/1000 sq. ft. (0.73 kg/100 sq. m.) of nitrogen derived from urea and of nitrogen derived from the urea aldehyde dispersion of Example 9, side by side. Although the greening due to nitrogen from the urea aldehyde dispersion lagged that of the urea produced nitrogen by about a week, the effect was noticeable for six weeks or more whereas the effect of the urea nitrogen was not noticeable after three weeks.

EXAMPLE 11

This example demonstrates that propionaldehyde functions as an effective cross-link inhibitor or polymerization chain-stopper in the preparation of urea aldehyde dispersions at a ratio of formaldehyde to propionaldehyde of about 49:1.

About 579 g of urea, 327 g of U.F.C.-85, 8.5 g of 97% propionaldehyde and 879 g of water were mixed and agitated with the further addition of about 1.4 g of 1:1 sulfuric acid while heat was applied over approximately 90 minutes to achieve a temperature of about 60° C. After about 15 minutes about 2.1 g 45% caustic potash were added to neutralize the dispersion. About 1.9 g of a non-ionic detergent, an ethoxylated alkylarylphenol (GAF "Igepal CO 630") were added together with about 1.25 g of a thickener-suspending agent, a xanthan gum (Kelco "Kelzan") dispersed in about 11.3 g of propylene glycol.

The dispersion thus prepared had a nitrogen content of 16.7% a urea:aldehyde ratio of 1.65:1 and a formaldehyde:propionaldehyde ratio of about 49:1. The initial viscosity was about 195 cps at 27° C. and rose only to about 388 cps after one month.

EXAMPLE 12

This example demonstrates the use of n-butyraldehyde as a cross-link inhibitor or polymerization chain stopper in the preparation of urea aldehyde dispersions.

About 1157 g of a 50% aqueous urea solution, 300 g of U.F.C.-85, 43 g of 97% n-butyraldehyde and 277 g of water were mixed and agitated. About 1.25 g of 1:1 sulfuric acid were added to obtain a pH of about 4 and the temperature brought to about 61° C. in about 105 minutes, whereupon the dispersion was neutralized by the addition of about 1.45 g of 45% caustic potash. About 1.5 g of a non-ionic detergent, an ethoxylated alkylarylphenol (GAF "Igepal-CO 630") and about 1.5 g of a thickener-suspending agent, a xanthan gum (Kelco "Kelzan") dispersed in 14 g of propylene glycol where then added. The dispersion had a nitrogen content of about 16.8%, a urea to aldehydes mol ratio of about 1.65:1, a formaldehyde to n-butyraldehyde mol ratio of about 10:1 and an initial viscosity of about 175 cps at about 25.6° C. No change in viscosity was observed over a period of three weeks.

EXAMPLE 13

This example demonstrates the use of isobutyraldehyde as a cross-link inhibitor or polymerization chain stopper in the preparation of urea aldehyde dispersion as in Example 12. Under the conditions of this example, the isobutyraldehyde appeared to react to produce insoluble products at a lower temperature and a faster rate than did the n-butyraldehyde. The resulting dispersion was less stable than that of normal butyraldehyde.

About 580 g of urea beads, 297 g of U.F.C.-85, 48.5 g isobutyraldehyde and 852 g of water were mixed and agitated followed by the addition of about 1.25 g of 1:1 sulfuric acid to adjust the pH to about 4. The temperature was brought to about 52.2° C. in about 70 minutes, whereupon the addition of about 3.5 g of 45% caustic potash brought the pH to about 7. About 1.5 g of a non-ionic detergent, an ethoxylated alkylarlyphenol (GAF "Igepal CO630") and about 0.9 g of a thickener-suspending agent, a xanthan gum (Kelco "Kelzan") dispersed in 8.4 g of propylene glycol were added. The dispersion had about the same composition and ratios as that of Example 12. However, although the initial viscosity was only about 19.8 cps, it rose fairly rapidly, reaching about 1000 cps in 16 days and coagulating to a paste in about 21 days. The useful shelf life of this preparation is limited compared with that of the n-butyraldehyde.

EXAMPLE 14

This example demonstrates the lack of stability of a urea aldehyde dispersion in which the only aldehyde used was formaldehyde.

About 577 g urea, 334 g U.F.C.-85 were dissolved in about 891 g of water to which was added about 1.5 g of 1:1 sulfuric acid. Heat was applied over a ninety minute period to bring the temperature to 60° C. after which it was held at that temperature for 15 minutes prior to the addition of about 1.75 g of 45% caustic potash to neutralize. About 1.9 g of a non-ionic detergent, an ethoxylated alkylarylphenol (GAF "Igepal CO 630") and about 1.2 of a thickener-suspending agent, a xanthan gum (Kelko "Kelzan") dispersed in about 10.8 g of propylene glycol were added. The urea formaldehyde dispersion contained about 16.7% nitrogen, the urea to formaldehyde ratio was about 1.65:1 and the initial viscosity was about 161 cps at 25.6° C. The viscosity rose rapidly reaching about 3000 cps in nine days, followed by product solidification in three more days.

We claim:

1. A process for preparing a dispersion of a urea aldehyde polymer which comprises:
   (a) reacting urea with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium; and
   (b) neutralizing said dispersion.

2. The process of claim 1 wherein said higher aldehyde is selected from the group consisting of acetaldehyde, propionaldehyde and mixtures thereof.

3. The process of claim 2 wherein the mole ratio of formaldehyde to higher aldehydes is from about 3:1 to 49:1.

4. The process of claim 1 wherein the mole ratio of urea to formaldehyde and higher aldehydes is from about 1:1 to 2.5:1.

5. The process of claim 1 wherein the nitrogen concentration in said dispersion is from about 5% to 20% based on the weight of nitrogen in the urea.

6. A process for preparing a stable dispersion of a urea aldehyde polymer which comprises:
   (a) reacting urea with formaldehyde and a higher aldehyde having from 2 to 4 carbon atoms, wherein the mole ratio of formaldehyde to said higher aldehyde is at least 2:1, in an aqueous medium in the presence of an acid catalyst to form a dispersion of urea aldehyde polymer in said aqueous medium;
   (b) neutralizing said aqueous dispersion; and
   (c) adding a thickener-suspending agent to said dispersion.

7. The process of claim 6 wherein said higher aldehyde is selected from the group consisting of acetaldehyde, propionaldehyde and mixtures thereof.

8. The process of claim 6 wherein the mole ratio of formaldehyde to higher aldehydes is from about 3:1 to 49:1.

9. The process of claim 6 wherein the mole ratio of urea to formaldehyde and higher aldehydes is from about 1:1 to 2.5:1.

10. The process of claim 6 wherein the nitrogen concentration in said dispersion is from about 5% to about 20% based on the weight of nitrogen in the urea.

11. The process of claim 6 which further comprises adding a non-ionic surfactant to said dispersion.

12. The process of claim 6 wherein said higher aldehyde is acetaldehyde and the mole ratio of formaldehyde to acetaldehyde is from about 3:1 to 19:1.

13. The process of claim 6 wherein said higher aldehyde is propionaldehyde and the mole ratio of formaldehyde to propionaldehyde is from 3:1 to 49:1.

14. The process of claim 6 wherein the amount of thickener-suspending agent is from about 0:01 to 1% by weight of said dispersion.

15. A process for preparing a stable dispersion of a urea aldehyde polymer which comprises:
   (a) reacting urea with formaldehyde and a higher aldehyde selected from the group consisting of acetaldehyde, propionaldehyde and mixtures thereof in an aqueous medium in the presence of an acid catalyst to form a dispersion of a urea aldehyde polymer in said aqueous medium containing 5% to 20% nitrogen by weight based on the weight of nitrogen in the urea, wherein the mole ratio of urea to said formaldehyde and higher aldehydes is from about 1:1 to 2.5:1 and the mole ratio of formaldehyde to said higher aldehydes is from about 3:1 to 49:1;
   (b) neutralizing said aqueous dispersion; and
   (c) adding a thickener-suspending agent to said dispersion.

16. The process of claim 15 wherein the mole ratio of urea to formaldehyde and higher aldehyde is from about 1.3:1 to 2:1.

17. The process of claim 15 wherein the nitrogen concentration in said dispersion is from about 13% to about 19% based on the weight of nitrogen in the urea.

18. The process of claim 15 which further comprises adding a non-ionic surfactant having a cloud point of 140° F. (60° C.) or higher in the amount of about 0.1% to 5% by weight of said dispersion.

19. The process of claim 15 wherein said higher aldehyde is acetaldehyde and the mole ratio of formaldehyde to acetaldehyde is 3:1 to 19:1.

20. The process of claim 15 wherein said higher aldehyde is propionaldehyde and the mole ratio of formaldehyde to propionaldehyde is from 3:1 to 49:1.

21. The process of claim 15 wherein the amount of thickener-suspending agent is from about 0.03% to 0.1%.

22. A product comprising the dispersion prepared by the process of claim 1.

23. A product comprising the dispersion prepared by the process of claim 6.

24. A product comprising the dispersion prepared by the process of claim 15.

* * * * *